United States Patent
Conner et al.

(10) Patent No.: US 7,670,214 B2
(45) Date of Patent: Mar. 2, 2010

(54) SYSTEMS AND METHODS FOR INTELLIGENT ALERTING FOR CABIN ALTITUDE DEPRESSURIZATION

(75) Inventors: Kevin J Conner, Kent, WA (US); Yasuo Ishihara, Kirkland, WA (US); Charles D. Bateman, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 420 days.

(21) Appl. No.: 11/469,376

(22) Filed: Aug. 31, 2006

(65) Prior Publication Data

US 2008/0057849 A1 Mar. 6, 2008

(51) Int. Cl.
*B64D 13/02* (2006.01)
*B64D 13/00* (2006.01)
*B60H 1/00* (2006.01)

(52) U.S. Cl. .............................. 454/74; 454/70; 454/71; 454/75; 454/76

(58) Field of Classification Search .................. 454/70, 454/71, 72, 74, 75, 76
See application file for complete search history.

(56) References Cited

U.S. PATENT DOCUMENTS

| | | | | |
|---|---|---|---|---|
| 2,473,586 A | * | 6/1949 | Hosford | 340/945 |
| RE23,445 E | * | 12/1951 | Teague, Jr. | 454/73 |
| 4,164,899 A | * | 8/1979 | Burgess | 454/72 |
| 4,164,900 A | * | 8/1979 | Aldrich | 454/72 |
| 4,553,474 A | * | 11/1985 | Wong et al. | 454/74 |
| 5,522,026 A | * | 5/1996 | Records et al. | 715/710 |
| 6,452,510 B1 | * | 9/2002 | Zysko | 340/970 |
| 6,507,776 B1 | * | 1/2003 | Fox, III | 701/11 |
| 6,983,206 B2 | * | 1/2006 | Conner et al. | 701/301 |
| 2001/0056316 A1 | * | 12/2001 | Johnson et al. | 701/14 |
| 2002/0173263 A1 | | 11/2002 | Petri et al. | |
| 2003/0157875 A1 | | 8/2003 | Horner et al. | |

FOREIGN PATENT DOCUMENTS

| | | |
|---|---|---|
| GB | 601058 | 4/1948 |
| WO | 02054035 A1 | 7/2002 |

* cited by examiner

*Primary Examiner*—Steven B McAllister
*Assistant Examiner*—Patrick F O'Reilly, III

(57) ABSTRACT

Methods and systems for providing a depressurization alert. An example method includes receiving a cabin depressurization discrete signal, determining if the cabin depressurization discrete signal is valid, and issuing a cabin depressurization alert, if the cabin depressurization discrete signal was determined to be valid. In accordance with further aspects of the invention, a time delay is executed before the receiving, determining, and issuing steps are repeated. The cabin depressurization discrete signal is determined not valid if uncorrected pressure is not greater than a predefined altitude. The uncorrected pressure is a raw pressure value produced by a Pitot-Static system. Also, the cabin depressurization discrete signal is determined not valid if the aircraft's altitude above an intended runway is not greater than a first predefined value. Additionally, the cabin depressurization discrete signal is determined not valid if an aircraft's altitude above terrain is not greater than a second predefined value.

18 Claims, 3 Drawing Sheets

SYSTEMS AND METHODS FOR INTELLIGENT ALERTING FOR CABIN ALTITUDE DEPRESSURIZATION

BACKGROUND OF THE INVENTION

Currently, some aircraft use a single horn to alert the flight crew of any of a number of various problems. It can take a pilot some time to isolate what problem caused the horn to be activated. This can lead a pilot to misdiagnose the cause of the activated horn.

Therefore, there exists a need to intelligently alert the flight crew of certain types of problems that were previously associated with a single horn activation.

SUMMARY OF THE INVENTION

The present invention provides methods and systems for providing a depressurization alert. An example method includes receiving a cabin depressurization discrete signal, determining if the cabin depressurization discrete signal is valid, and issuing a cabin depressurization alert, if the cabin depressurization discrete signal was determined to be valid.

In accordance with further aspects of the invention, a time delay is executed before the receiving, determining, and issuing steps are repeated.

In accordance with other aspects of the invention, the cabin depressurization discrete signal is determined not valid if uncorrected pressure is not greater than a predefined altitude. The uncorrected pressure is a raw pressure value produced by a Pitot-Static system. Also, the cabin depressurization discrete signal is determined not valid if the aircraft's altitude above an intended runway is not greater than a first predefined value. Additionally, the cabin depressurization discrete signal is determined not valid if an aircraft's altitude above terrain is not greater than a second predefined value.

In accordance with still further aspects of the invention, the cabin depressurization alert includes a voice signal that is output to one or more speakers.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
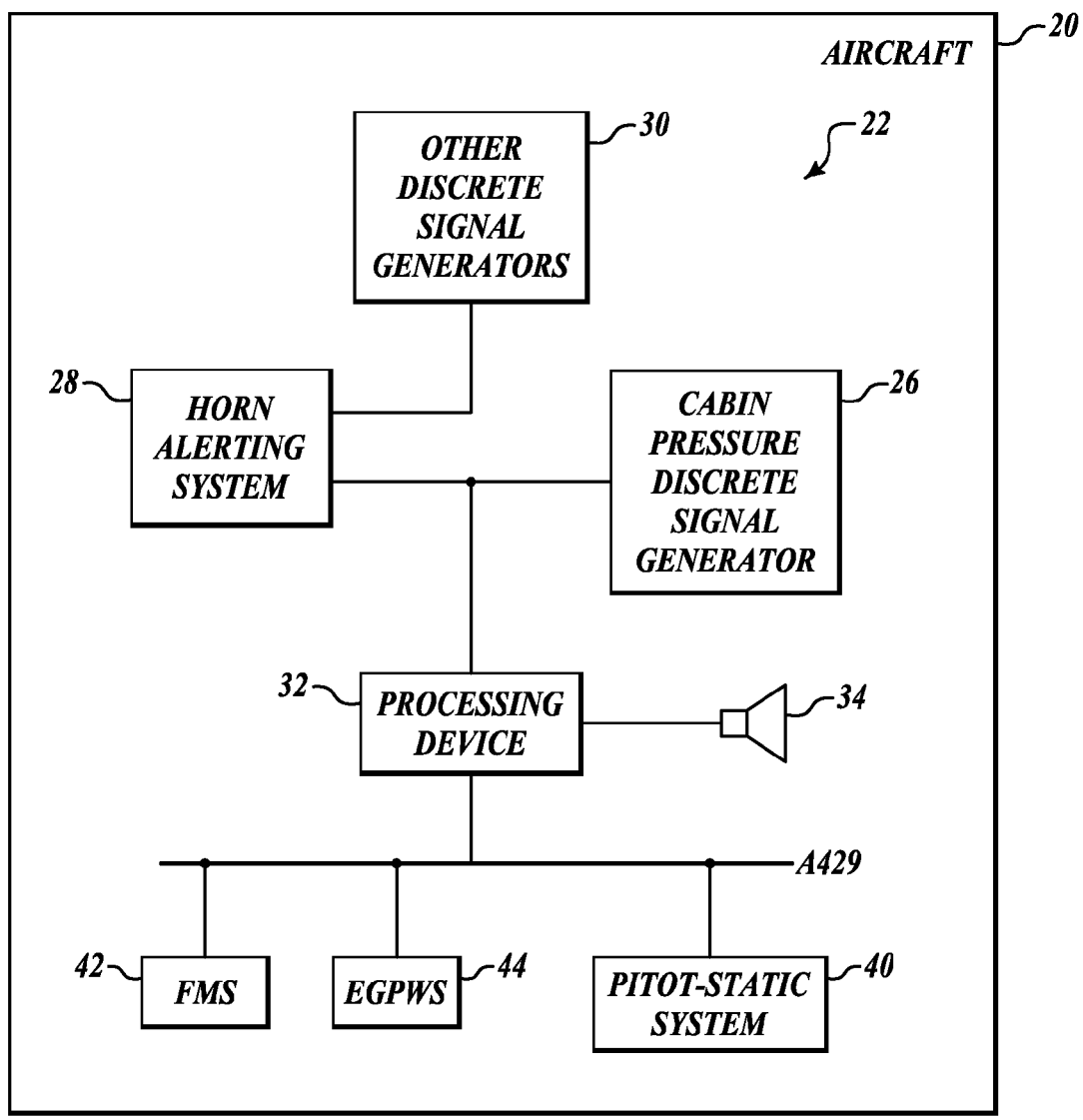
FIG. 1 illustrates a schematic diagram of a system formed in accordance with an embodiment of the present invention.

FIG. 1 illustrates a schematic block diagram of an example cabin pressure alerting system 22 located aboard an aircraft 20 or some other pressurized vehicle. The system 22 includes a cabin depressurization discrete signal generator 26, a horn-alerting system 28, other discrete signal generators 30, a processing device 32, and one or more speakers 34. In one embodiment, the system 22 only includes the cabin depressurization discrete signal generator 26 and the processing device 32 with attached speakers 34. The horn-alerting system 28 receives discrete signals from any of the other discrete signal generators 30 or the cabin depressurization discrete signal generator 26.

The processing device 32 also receives the discrete signal generated by the cabin depressurization discrete signal generator 26. The processing device 32 then outputs an advisory message via the one or more speakers 34 based on certain predefined logic parameters after receiving the discrete signal from the generator 26. The logic parameters (see FIG. 3) use information retrieved from other sources such as a Flight Management System (FMS) 42, an Enhanced Ground Proximity Warning System (EGPWS) 44, and a Pitot-Static system 40. In one embodiment, an Air Data Computer is part of the Pitot-Static system 40 for converting pressure data into electrical data (such as for use on ARINC 429). The A429 bus is connected to many pieces of avionics in the aircraft such as the EGPWS 44 and FMS 42.

In one embodiment, the processing device 32 includes a voice synthesizing component for generating a voice message (e.g., "cabin altitude"). In another embodiment, the processing device retrieves a previously recorded voice message from either internal or external memory or some other source (not shown) and outputs the retrieved voice message to the one or more speakers 34.

Figure 2:
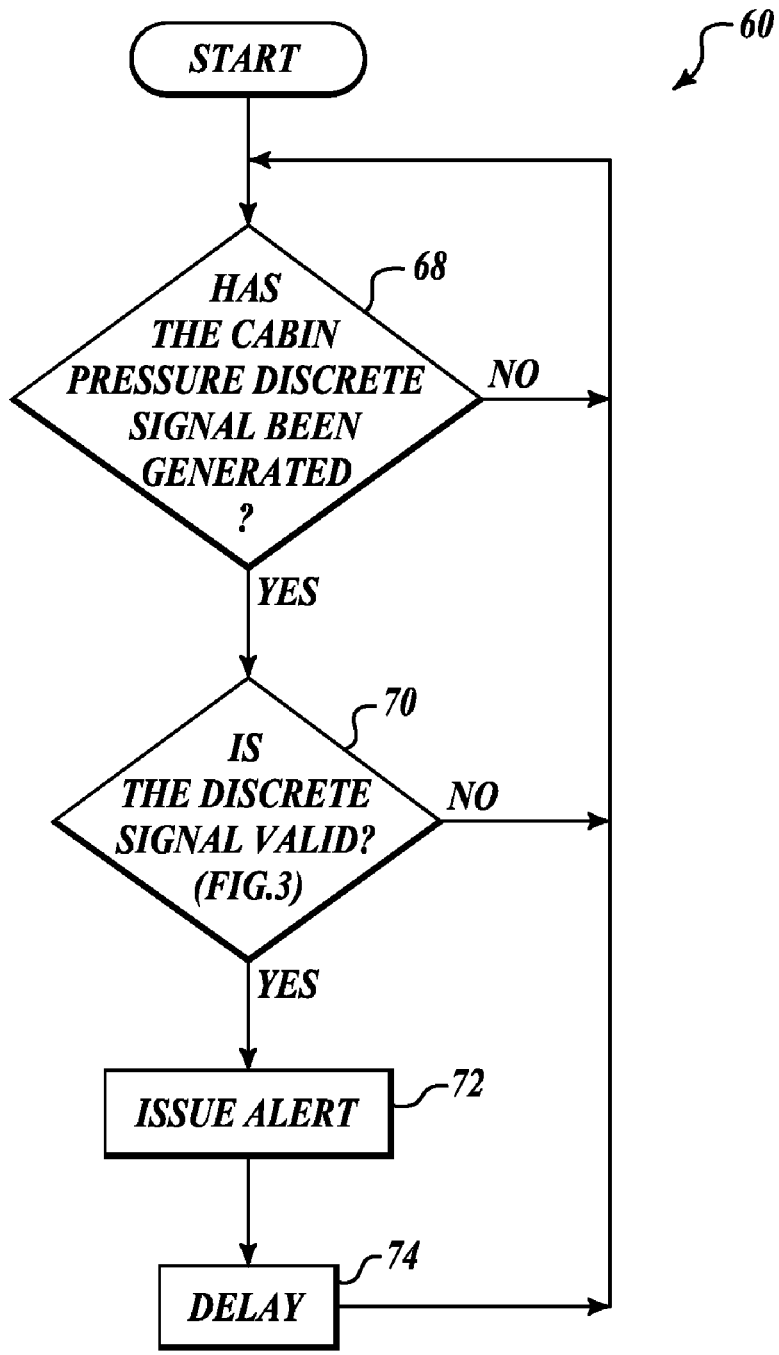
FIGS. 2 and 3 illustrate example processes performed by the system shown in FIG. 1 in accordance with embodiments of the present invention.

FIG. 2 illustrates an example process 60 performed by the processing device 32 of FIG. 1. First, at a decision block 68, the processor 32 determines if the cabin depressurization discrete signal has been generated and outputted by the generator 26. If the cabin depressurization discrete signal has not been generated, then the process 60 goes into a wait state until a cabin depressurization discrete signal has been generated. If the cabin depressurization discrete signal was determined to be generated, then process 60 continues to a decision block 70 whereby the processing device 32 determines if the cabin depressurization discrete signal is valid. An example process for determining if the cabin depressurization discrete signal is valid is shown below with regard to FIG. 3. If the processing device 32 determines that the cabin depressurization discrete signal is not valid, then the process 60 returns to the decision block 68. If it was determined that the cabin depressurization discrete signal was valid, then the processing device 32 issues a cabin pressure advisory as shown in block 72 by outputting a signal to the one or more speakers 34. Next, at a block 74, the process 60 is delayed and returned to the decision block 68 to repeat the process.

Figure 3:
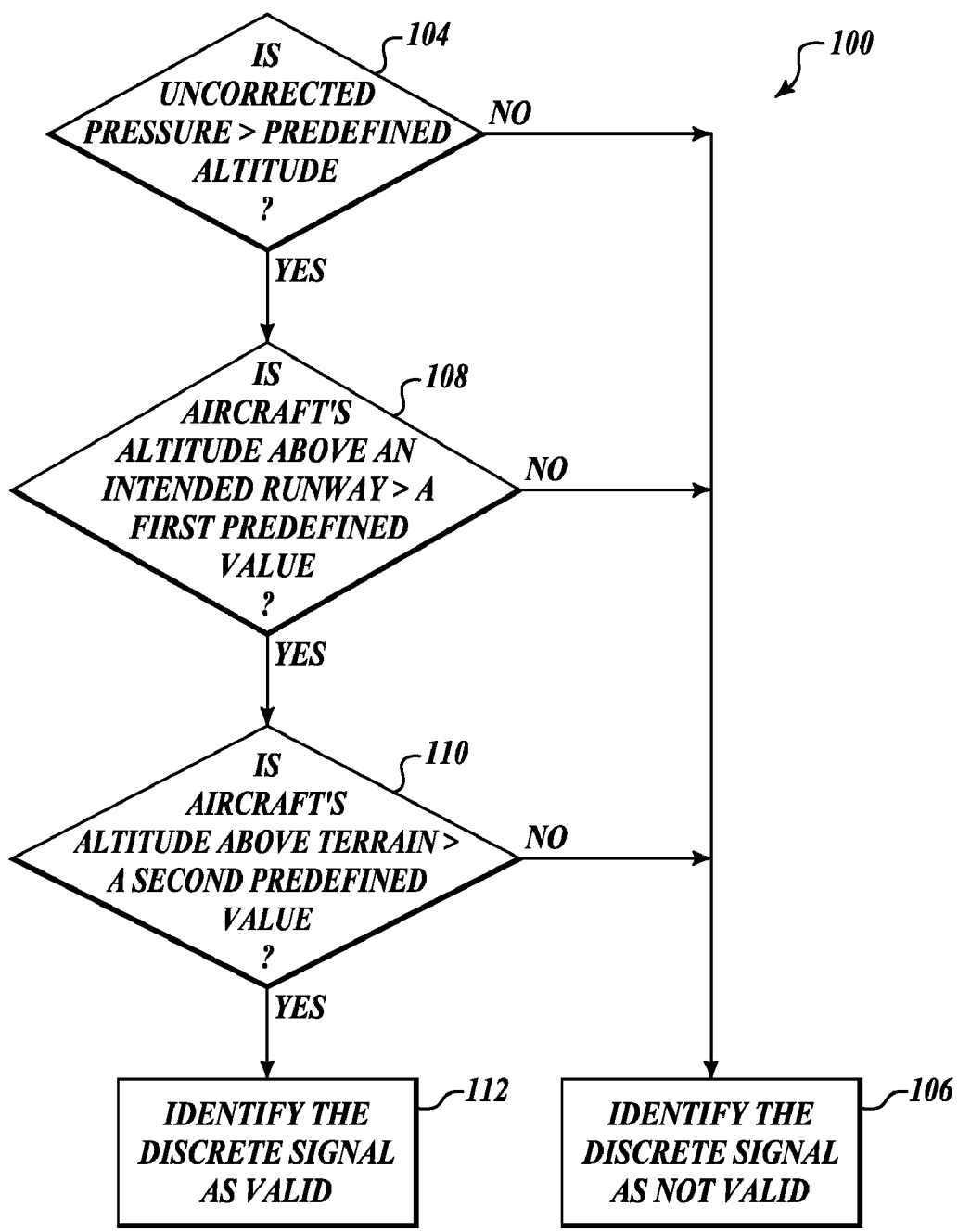

FIG. 3 illustrates an example process 100 performed by the processing device 32 for the determination of whether the cabin depressurization discrete signal is valid or not (see block 70, FIG. 2). First, at a decision block 104, the processing device 32 determines if an uncorrected pressure altitude value is greater than a predefined altitude. The uncorrected pressure altitude value is the raw altitude value produced by the aircraft's Pitot-Static system 40 before it is adjusted using the reference pressure setting. The predefined altitude is an altitude where the cabin depressurization discrete signal would normally be generated if a cabin depressurization occurred. In one embodiment, the pre-defined altitude is 10,000 feet. If the uncorrected pressure is not greater than the predefined altitude, then the cabin depressurization discrete signal is identified as being not valid, see block 106. If the uncorrected pressure was greater than the predefined altitude, then the process 100 continues onto a decision block 108. At the decision block 108, the processing device 32 determines if the altitude of the aircraft above a closest or an intended runway or airport is greater than a first predefined altitude value. This determination of closest or intended runway or airport is described in more detail in U.S. Pat. No. 6,983,206, which is hereby incorporated by reference, and might be incorporated in the EGPWS 44. If the aircraft's altitude above the intended runway/airport is not greater than the first predefined value, then the process 100 continues to block 106 that identifies the cabin depressurization discrete signal as being not valid. If the aircraft's altitude above the intended runway/airport is greater than the first predefined value, the process 100 continues onto a decision block 110.

At the decision block 110, the processing device 32 determines if the aircraft's altitude above terrain is greater than a second predefined altitude value. If the aircraft's altitude above the terrain is not greater than the second predefined value, the process 100 continues to block 106, thereby identifying the cabin depressurization discrete signal as being not valid. If, however, the aircraft's altitude above terrain is greater than a second predefined value, the process 100 continues to a block 112 whereby the cabin depressurization discrete signal is identified as being valid. After the steps in blocks 106 or 112 are performed, the process 100 returns to the decision block 70 as shown in FIG. 2. Terrain information may be provided by a terrain database included with the EGPWS 44 and the aircraft altitude information may be provided by a number of sources, such as the EGPWS 44 (geometric altitude), the FMS 42, a radar altimeter or a combination of these sources.

In another embodiment, the processing device 32 performs one or a portion of all of the decision steps of blocks 104, 108, 110 in order to determine validity.

While the preferred embodiment of the invention has been illustrated and described, as noted above, many changes can be made without departing from the spirit and scope of the invention. For example, the steps shown in FIGS. 2 and 3 may be performed in an existing aircraft system, such as the EGPWS 44 or the FMS 42. Accordingly, the scope of the invention is not limited by the disclosure of the preferred embodiment. Instead, the invention should be determined entirely by reference to the claims that follow.

The invention claimed is:

1. A method for providing a depressurization alert, the method comprising:
   a) receiving a cabin depressurization discrete signal;
   b) determining if the cabin depressurization discrete signal is valid, wherein determining comprises determining the cabin depressurization discrete signal is not valid if an uncorrected pressure altitude is not greater than a predefined altitude, wherein the uncorrected pressure altitude is a raw altitude value measured by an aircraft pressure measuring apparatus, and wherein the predefined altitude is an altitude where the cabin depressurization discrete signal is generated if a cabin depressurization occurs; and
   c) issuing a cabin depressurization alert, if the cabin depressurization discrete signal was determined to be valid.

2. The method of claim 1, further comprising executing a time delay before repeating a)-c).

3. The method of claim 1, wherein the uncorrected pressure altitude is a raw altitude value produced by a pitot-static system.

4. The method of claim 1, wherein b) includes determining the cabin depressurization discrete signal is not valid if the aircraft's altitude above an intended runway is not greater than a predefined value.

5. The method of claim 1, wherein b) includes determining the cabin depressurization discrete signal is not valid if an aircraft's altitude above terrain is not greater than a predefined value.

6. The method of claim 5, wherein the aircraft's altitude above terrain includes determining the aircraft's altitude above terrain using terrain data.

7. The method of claim 1, wherein issuing a cabin depressurization alert includes outputting a voice signal to one or more speakers.

8. The method of claim 1, wherein b) comprises:
   determining the cabin depressurization discrete signal is not valid if the aircraft's altitude above an intended runway is not greater than a first predefined value; and
   determining the cabin depressurization discrete signal is not valid if an aircraft's altitude above terrain is not greater than a second predefined value.

9. A system for providing a depressurization alert, the system comprising:
   a processing device configured:
      for receiving a cabin depressurization discrete signal,
      for determining if the cabin depressurization discrete signal is valid, wherein the processing device determines the cabin depressurization discrete signal is not valid if an uncorrected pressure altitude is not greater than a predefined altitude, wherein the uncorrected pressure altitude is a raw altitude value measured by an aircraft pressure measuring apparatus, and wherein the predefined altitude is an altitude where the cabin depressurization discrete signal is generated if a cabin depressurization occurs, and
      for issuing a cabin depressurization alert, if the cabin depressurization discrete signal was determined to be valid; and
   an output device in communication with the processing device for outputting an alert based on the issued cabin depressurization alert.

10. The system of claim 9, wherein the processing device is further configured for executing a time delay before repeating actions performed by the processing device.

11. The system of claim 9, wherein the uncorrected pressure altitude is a raw altitude value produced by a pitot-static system.

12. The system of claim 9, wherein the processing device determines the cabin depressurization discrete signal is not valid if the aircraft's altitude above an intended runway is not greater than a predefined value.

13. The system of claim 9, wherein the processing device determines the cabin depressurization discrete signal is not valid if an aircraft's altitude above terrain is not greater than a predefined value.

14. The system of claim 13, further comprising a data storage device in communication with the processing device for storing terrain data, wherein the processing device further determines the cabin depressurization discrete signal is not valid if an aircraft's altitude above terrain is not greater than the predefined value based on the stored terrain data.

15. The system of claim 9, wherein the output device includes one or more speakers.

16. The system of claim 9, wherein the processing device further determines the cabin depressurization discrete signal is not valid if the aircraft's altitude above an intended runway is not greater than a first predefined value and determines the cabin depressurization discrete signal is not valid if an aircraft's altitude above terrain is not greater than a second predefined value.

17. A system for providing a depressurization alert, the system comprising:
   a processing device configured to:
      receive a cabin depressurization discrete signal,
      determine if the cabin depressurization discrete signal is valid by comparing an aircraft's altitude to a plurality of geographical features, the processing device the cabin depressurization discrete signal is not valid if the aircraft's altitude above an intended runway is not greater than a predefined value, and issue a cabin depressurization alert, if the cabin depressurization discrete signal was determined to be valid; and an output device in communication with the processing device configured to output an alert based on the issued cabin depressurization alert.

18. A system for providing a depressurization alert, the system comprising:

a processing device configured to:

receive a cabin depressurization discrete signal, determine if the cabin depressurization discrete signal is valid by comparing an aircraft's altitude to a plurality of geographical features, the processing device the cabin depressurization discrete signal is not valid if the aircraft's altitude above terrain is not greater than a predefined value, and issue a cabin depressurization alert, if the cabin depressurization discrete signal was determined to be valid; and an output device in communication with the processing device configured to output an alert based on the issued cabin depressurization alert.

* * * * *